Patented Sept. 10, 1946

2,407,332

UNITED STATES PATENT OFFICE 2,407,332

PURIFICATION OF ACETYLENE BY MEANS OF ARSENIC TRICHLORIDE

Richard B. Wearn and Gordon N. Jarman, United States Army

No Drawing. Application April 21, 1945, Serial No. 589,687

3 Claims. (Cl. 260—679)

(Granted under the act of March 3, 1883, as amended April 30, 1928; 370 O. G. 757)

The invention described herein may be manufactured and used by or for the Government, for governmental purposes, without payment to us of any royalty thereon.

This invention relates to the manufacture of acetylene and particularly to the purification of acetylene produced by the usual carbide process.

One of the objects of this invention is to provide a purification process which will remove substantially all the impurities which are inherently present in the gas due to its manufacture.

A further object of this invention is to carry out the purification of acetylene by a method which is cheap, efficient, reliable, and wherein the material used is readily available.

The process forming the subject matter of this invention consists essentially of using arsenic trichloride for the purification of acetylene by the countercurrent principle.

Other and more specific objects of this invention will become readily apparent to persons skilled in the art from a consideration of the following description.

Acetylene made from crude calcium carbide ordinarily contains the following impurities: phosphine, arsine, ammonia, hydrogen sulfide and related compounds. These will react with salts of heavy metals such as are used as catalysts in some chemical processes such as the preparation of acetylene, vinyl chloride, chloroprene and other industrial processes.

These materials are also objectionable in processes, in which acetylene is used for heating purposes because some of the impurities are transformed into poisonous compounds of phosphorus and arsenic for instance. In addition, the compressed acetylene is highly explosive by shock or by catalytic action of the same impurities decomposing it into its elements.

The usual scrubbing with sulfuric acid in steel towers is not entirely satisfactory because of:

(1) Incomplete removal of the impurities present shown by formation of sludge, when portions of purified gas is tested with mercuric chloride reagent, and (2) Loss of an appreciable amount of acetylene by reaction with the sulfuric acid.

Sodium hypochlorite solutions used for purification of acetylene, remove arsine, phosphine and similar impurities. But this process possesses a serious drawback in that it is dangerous, since acetylene, which has been in intimate contact with sodium hypochlorite solution is, under some conditions, yet undetermined, spontaneously inflammable.

The purification of acetylene has also been affected by the use of other materials such as metal chlorides, specifically $HgCl_2$ and $CuCl_2$. These salts reacted readily with substances such as arsine and phosphine, but proved to be corrosive to the steel towers, and the water formed in the process was found objectionable.

The preferred embodiment of this invention consists in using arsenic trichloride as the main reagent since it combines readily with most of the usual impurities found in acetylene without producing water or moisture and without producing undesirable side reactions which are ever present in the scrubbing methods heretofore used commercially.

Preliminary experiments showed that the removal of phosphine, arsine, hydrogen sulfide and ammonia in accordance with this invention is substantially quantitative.

In practicing this invention the crude acetylene is passed upwardly through a packed tower while the arsenic trichloride is sprayed into the top of the tower over the packing.

The material used in the packed tower is well known in this art. It may consist of Berl-saddles or of sections of Raschig rings.

To compare the efficiency of the different materials used, the following experiment was run.

A measured quantity of the crude gas was passed through a 3% sodium hypochlorite solution. The absorbed impurities, which are known to be principally phosphine and arsine, were analyzed by standard colorimetric and gravimetric methods and were reported as "percent phosphine" for convenience. The average percentage found was 0.1%.

The same quantity of the crude gas was passed upwardly through a packed tower while arsenic trichloride was sprayed downward into and through the tower and then the gas was led through an adjacent tower containing 3% sodium hypochlorite solution. The latter was then analyzed to determine the amount of impurities not absorbed by the arsenic trichloride. The concentration of these impurities had been reduced to 0.025%.

A soda-lime tube was placed in the train between the arsenic trichloride tower and the sodium hypochlorite solution to prevent the contamination of the latter by arsenic trichloride vapors.

The results determined by gravimetric analysis showed that the removal had been quantitative.

The deposit of arsenic and phosphine-arsenic reduction products of the absorbed arsine and phosphine, took place on a very small area of the tower packing and in the immediate vicinity of the inlet tube. This indicates a rapid and quantitative reaction.

The acetylene, after scrubbing by arsenic trichloride, produced only a slight turbidity when passed through acidified mercuric chloride solution, while the unscrubbed acetylene produced a heavy precipitate. The ordinary purified or "cylinder grade" acetylene produced a slight precipitate in the same solution.

To complete the purification of acetylene the vapors of arsenic trichloride can be removed by washing the gas with water or by passing it through an alkaline medium.

While we have shown and described the preferred embodiment of this invention, we wish it to be understood that we do not confine ourselves to the precise details herein set forth, by way of illustration, as, it is apparent that many changes and variations may be made therein by those skilled in the art, without departing from the spirit of the invention or exceeding the scope of the appended claims.

We claim:

1. A method of purifying crude acetylene comprising intimately contacting the crude acetylene with arsenic trichloride.

2. The process of removing impurities from crude acetylene, such as arsine and phosphine, which comprises intimately contacting the crude acetylene with arsenic trichloride, and removing any arsenic trichloride from the purified acetylene by scrubbing with water.

3. The process of removing the impurities such as arsine and phosphine from crude acetylene, which comprises intimately contacting said crude acetylene with arsenic trichloride and removing the resultant undesirable materials by passing the gaseous mix through an alkaline medium.

RICHARD B. WEARN.
GORDON N. JARMAN.